United States Patent
Kanaoka

(10) Patent No.: US 10,239,201 B2
(45) Date of Patent: Mar. 26, 2019

(54) MASTER-SLAVE SYSTEM

(71) Applicant: Muscle Corporation, Osaka (JP)

(72) Inventor: Katsuya Kanaoka, Shiga (JP)

(73) Assignee: Muscle Corporation, Osaka (JP)

( * ) Notice: Subject to any disclaimer, the term of this patent is extended or adjusted under 35 U.S.C. 154(b) by 209 days.

(21) Appl. No.: 15/307,841

(22) PCT Filed: Apr. 28, 2015

(86) PCT No.: PCT/JP2015/062755
§ 371 (c)(1),
(2) Date: Oct. 31, 2016

(87) PCT Pub. No.: WO2015/166932
PCT Pub. Date: Nov. 5, 2015

(65) Prior Publication Data
US 2017/0050310 A1 Feb. 23, 2017

(30) Foreign Application Priority Data

Apr. 30, 2014 (JP) ................................. 2014-093322

(51) Int. Cl.
*G06F 19/00* (2018.01)
*B25J 3/00* (2006.01)
(Continued)

(52) U.S. Cl.
CPC . *B25J 3/00* (2013.01); *B25J 3/04* (2013.01); *B25J 9/1689* (2013.01); *B25J 13/025* (2013.01);
(Continued)

(58) Field of Classification Search
CPC ..... B25J 3/00; B25J 3/04; B25J 9/1689; B25J 13/025; B25J 13/084; B25J 13/085; B25J 13/088
(Continued)

(56) References Cited

U.S. PATENT DOCUMENTS 8,108,072 B2 * 1/2012 Zhao .................... G06K 9/3216
382/153
8,977,388 B2 * 3/2015 Jacobsen ................... B25J 3/04
318/568.22
(Continued)

FOREIGN PATENT DOCUMENTS

JP 02-298480 12/1990
JP 05-252779 9/1993
(Continued)

OTHER PUBLICATIONS

Miyazaki, et al., Parallel Control Method for a Bilateral Master-Slave Manipulator, Journal of the Robotics Society of Japan, vol. 7, No. 5, pp. 446-452, Oct. 1989.
(Continued)

*Primary Examiner* — Ronnie M Mancho
(74) *Attorney, Agent, or Firm* — Kirschstein, Israel, Schiffmiller & Pieroni, P.C.

(57) ABSTRACT

A master-slave system (1) according to the present invention includes a slave actuator ($As_1$ to $As_3$) for generating a slave driving force ($\tau_s$) to control a slave robot in terms of driving force, an effective driving force sensor ($Fs_1$ to $Fs_3$) for measuring a slave effective driving force ($\tau_{sa}$) actually acting on a terminal output axis of the slave actuator ($As_1$ to $As_3$), and a slave target effective driving force calculating device (3) for calculating a slave target effective driving force ($\tau_{sad}$) which is a target value for the slave effective driving force ($\tau_{sa}$), on the basis of a master operating force ($f_m$) applied to the master robot by an operator (U). The slave actuator ($As_1$ to $As_3$) generates the slave driving force ($\tau_s$) on the basis of the slave target effective driving force ($\tau_{sad}$) and the slave effective driving force ($\tau_{sa}$).

2 Claims, 4 Drawing Sheets

(51) Int. Cl.
*B25J 13/02* (2006.01)
*B25J 13/08* (2006.01)
*B25J 3/04* (2006.01)
*B25J 9/16* (2006.01)

(52) U.S. Cl.
CPC .......... *B25J 13/084* (2013.01); *B25J 13/085* (2013.01); *B25J 13/088* (2013.01)

(58) Field of Classification Search
USPC .................................................. 700/245, 258
See application file for complete search history.

(56) References Cited

U.S. PATENT DOCUMENTS

| | | | |
|---|---|---|---|
| 9,060,796 B2 * | 6/2015 | Seo ................... | A61B 19/2203 |
| 9,788,909 B2 * | 10/2017 | Larkin ................... | B25J 9/1671 |
| 9,844,447 B2 * | 12/2017 | van der Merwe ........ | A61F 2/54 |
| 9,855,662 B2 * | 1/2018 | Ruiz Morales ........ | B25J 13/085 |
| 9,895,813 B2 * | 2/2018 | Blumenkranz ........ | B25J 13/085 |
| 2010/0041991 A1 | 2/2010 | Roundhill | |
| 2010/0139436 A1 | 6/2010 | Kawashima | |

FOREIGN PATENT DOCUMENTS

| | | |
|---|---|---|
| JP | 2002-307336 | 10/2002 |
| JP | 2011-056601 | 3/2011 |
| JP | 2011-189445 | 9/2011 |
| JP | 2012-128795 | 7/2012 |
| JP | 2014-004656 | 1/2014 |
| JP | 2015-037824 | 2/2015 |
| JP | 2015-089605 | 5/2015 |

OTHER PUBLICATIONS

Yoshinada, A Study on the Large Scale Bilateral Manipulator, Tokyo Institute of Technology Doctoral Thesis, 2012.

Kikuuwe et al., Proxy-Based Sliding Mode Control: A Safer Extension of PID Position Control, IEEE Transactions on Robotics, vol. 26, No. 4, pp. 670-683, Aug. 2010.

Wen et al., Research on a Development Hydraulic Servo Telerobotics System, Proceedings of the 2011 IEEE International Conference on Mechatronics and Automation (ICMA), pp. 916-919, Aug. 2011.

Mizoguchi et al., Scaling Bilateral Controls with Impedance Transmission Using Transfer Admittance, Proceedings of the 12th IEEE International Workshop on Advanced Motion Control (AMC), pp. 1-6, Mar. 2012.

International Search Report in PCT/JP2015/062755, dated Jul. 21, 2015.

* cited by examiner

MASTER-SLAVE SYSTEM

TECHNICAL FIELD

The present invention relates to a master-slave system to which force-projecting bilateral control is applied.

BACKGROUND ART

The so-called master-slave system originated from a mechanical master-slave system in which a master robot and a slave robot are mechanically linked so as to work in coordination with each other. The mechanical master-slave system is advantageous in that the operator can have a direct feel of operation, but also disadvantageous in that: the degree of freedom in mechanism design is limited because of geometric restrictions between the operator and the master robot and also between the operator and the slave robot; the system naturally feels heavy to manipulate because the system is driven by human power; and further, the system has trouble in ensuring safety when abnormalities arise.

Therefore, although the mechanical master-slave system is still considered useful, the current mainstream is an electrical master-slave system in which the master robot and the slave robot are electrically interconnected but mechanically separated, and are operable independently of each other. In general, the electrical system can be flexibly controlled with electrical means or by means of software, and can have a mechanism that can be designed with flexibility, and further, the safety of the system can be ensured readily by constructing the system such that the operator is not involved in the working space of a high power actuator.

The electrical master-slave system having these characteristics has been developed mainly for such an application as remote control (i.e., teleoperation), and therefore, the study thereof was carried out mainly focusing on improvements in position and force repeatability, transparency, or communication time delay. An overview description will be provided below regarding basic types of bilateral control for the electrical master-slave system.

First, for convenience of explanation, the equations of motion that represent the dynamics of the master robot and the slave robot are defined by way of example as follows:

[Expression 1]

$$J_m^T f_m + \tau_m = M_m \ddot{q}_m + r_m \qquad (1);$$

[Expression 2]

$$\tau_s = M_s \ddot{q}_s + r_s + J_s^T f_s \qquad (2),$$

where $f_m(t)$ is a master operating force applied to an operating end of the master robot by the operator at time t, and $f_s(t)$ is a slave working force applied to the environment (i.e., a work object) by a working end of the slave robot at the same time t. Furthermore, respectively for the master robot and the slave robot, $q_m(t)$ and $q_s(t)$ are joint displacements, $\tau_m(t)$ and $\tau_s(t)$ are joint driving forces, $M_m(q_m)$ and $M_s(q_s)$ are inertia matrices, and $r_m(\dot{q}_m, q_m)$ and $r_s(\dot{q}_s, q_s)$ are remainder terms aggregating effects other than inertia. $J_m(q_m)$ and $J_s(q_s)$ are Jacobian matrices representing differential kinematics and satisfying the following relationship:

[Expression 3]

$$\dot{x}_m = J_m \dot{q}_m \qquad (3);$$

[Expression 4]

$$\dot{x}_s = J_s \dot{q}_s \qquad (4),$$

where $x_m(t)$ and $x_s(t)$ are displacements of the operating end of the master robot and the working end of the slave robot in a work coordinate system respectively corresponding to $q_m(t)$ and $q_s(t)$. Note that symbols, such as "(t)", which indicate independent variables of a function might be omitted herein.

[Position-Symmetric Bilateral Control]

Position-symmetric bilateral control is bilateral displacement error servo control between the master and the slave. This control eliminates the need for a force sensor, and therefore, renders it possible to readily configure a relatively stable system. In the case where proportional control in the work coordinate system is used, control laws for the master robot and the slave robot are, for example, as shown below:

[Expression 5]

$$\tau_m = J_m^T S_f^{-1} K_p (x_s - S_p^{-1} x_m) \qquad (5);$$

[Expression 6]

$$\tau_s = J_s^T K_p (S_p^{-1} x_m - x_s) \qquad (6),$$

where $K_p$ is a position control gain. Moreover, $S_f$ is the scale ratio of force from the master robot to the slave robot, and $S_p$ is the scale ratio of displacement from the slave robot to the master robot.

From the master dynamics (1), the slave dynamics (2), the master control law (5), and the slave control law (6), the following expression is obtained.

[Expression 7]

$$f_m = J_m^{-T}(M_m \ddot{q}_m + r_m) + S_f^{-1} J_s^{-T}(M_s \ddot{q}_s + r_s) + S_f^{-1} f_s \qquad (7)$$

In this manner, in the position-symmetric bilateral control, the influence of the master dynamics is added to the master operating force $f_m$ as is, and the influence of the slave dynamics and the slave working force $f_s$ are also added by a factor of $S_f^{-1}$.

[Force-Reflecting Bilateral Control]

In force-reflecting bilateral control, a working force sensor for measuring the slave working force $f_s$ is disposed at the working end of the slave robot in order to "reflect" the slave working force $f_s$ in the force of driving the master. In this case, the master control law is as shown below. Note that the slave control law is the same as in Expression (6) for the position-symmetric bilateral control.

[Expression 8]

$$\tau_m = -J_m^T S_f^{-1} f_s \qquad (8)$$

From the master dynamics (1) and the master control law (8), the following expression is obtained.

[Expression 9]

$$f_m = J_m^{-T}(M_m \ddot{q}_m + r_m) + S_f^{-1} f_s \qquad (9)$$

In the case of the force-reflecting bilateral control, as in the case of the position-symmetric bilateral control, the influence of the master dynamics is added to the master operating force $f_m$ as is, and the slave working force $f_s$ is also added by a factor of $S_f^{-1}$. On the other hand, the master operating force $f_m$ is not influenced by the slave dynamics.

[Force-Reflecting Servo Bilateral Control]

In force-reflecting servo bilateral control, an operating force sensor for measuring the master operating force $f_m$ is disposed at the operating end of the master robot, a working force sensor for measuring the slave working force $f_s$ is disposed at the working end of the slave robot, and a force error servomechanism is configured on the master side. In this case, the master control law is as shown below.

[Expression 10]

$$\tau_m = J_m^T K_f(f_m - S_f^{-1} f_s) - J_m^T S_f^{-1} f_s \qquad (10)$$

The above expression includes force error servo control on the first term of the right-hand side in addition to the master control law (8) for the force-reflecting type. Note that $K_f$ is a force control gain. Moreover, the slave control law is the same as in Expression (6) for the position-symmetric bilateral control.

From the master dynamics (1) and the master control law (10), the following expression is obtained. Note that I is an identity matrix.

[Expression 11]

$$f_m = (I + K_f)^{-1} J_m^{-T}(M_m \ddot{q}_m + r_m) + S_f^{-1} f_s \qquad (11)$$

Furthermore, by increasing the force control gain $K_f$ in the above expression to a sufficient degree, the following expression can be obtained.

[Expression 12]

$$f_m \approx S_f^{-1} f_s \qquad (12)$$

In this manner, in the case of the force-reflecting servo bilateral control, by sufficiently increasing the force control gain $K_f$, the influence of the master dynamics on the master operating force $f_m$ can be reduced to a negligible degree, so that only the slave working force $f_s$ is added to the master operating force $f_m$ by a factor of $S_f^{-1}$. However, for implementation reasons, the stability of bilateral control decreases as the force control gain $K_f$ increases, and therefore, it is difficult to eliminate the influence of the master dynamics on the master operating force $f_m$, so that complete transparency cannot be achieved.

[Parallel Bilateral Control]

In Non-Patent Document 1, Miyazaki et al. propose parallel bilateral control, which is an improvement to the traditional serial connection method for bilateral control. In the case of the parallel type, an operating force sensor for measuring the master operating force $f_m$ is disposed at the operating end of the master robot, a working force sensor for measuring the slave working force $f_s$ is disposed at the working end of the slave robot, and a parallel displacement error servomechanism is configured by the master and the slave. In this case, the control laws are as shown below:

[Expression 13]

$$\tau_m = J_m^T K_p(x_d - S_p^{-1} x_m) \qquad (13);$$

[Expression 14]

$$\tau_s = J_s^T S_f K_p(x_d - x_s) \qquad (14);$$

[Expression 15]

$$x_d = K_f(f_m - S_f^{-1} f_s) \qquad (15).$$

Note that $X_d(t)$ is a target displacement for each of the working end of the slave robot and the scaled operating end of the master robot at time t in the work coordinate system.

From the master dynamics (1), the slave dynamics (2), the master control law (13), the slave control law (14), and the target displacement calculation (15), the following expression can be obtained.

[Expression 16]

$$f_m = (I + 2K_p K_f)^{-1} J_m^{-T}(M_m \ddot{q}_m + r_m) + \\ (I + 2K_p K_f)^{-1} S_f^{-1} J_s^{-T}(M_s \ddot{q}_s + r_s) + \\ (I + 2K_p K_f)^{-1} K_p(S_p^{-1} x_m + x_s) + S_f^{-1} f_s \qquad (16)$$

Furthermore, by increasing the force control gain $K_f$ in the above expression to a sufficient degree, the following expression can be obtained.

[Expression 17]

$$f_m \approx S_f^{-1} f_s \qquad (17)$$

The advantage of the parallel bilateral control is that phase lag is reduced by providing the master control law and the slave control law in parallel, resulting in bilateral control with increased stability. However, in the case of the parallel bilateral control, the master operating force $f_m$ is influenced by both the master dynamics and the slave dynamics, as can be seen from the first and second terms of the right-hand side of Expression (16). Moreover, in the case of the parallel bilateral control, even a spring constant term, which is not included in the original dynamics, is added to the master operating force $f_m$, as can be seen from the third term of the right-hand side of Expression (16). Such influences can be reduced to a negligible degree by increasing the force control gain $K_f$, but for implementation reasons, even the increased stability of the bilateral control can be weakened as the force control gain $K_f$ increases, and therefore, even the parallel bilateral control cannot achieve complete transparency.

[Force-Projecting Bilateral Control]

The basic types of bilateral control, including the position-symmetric type, the force-reflecting type, the force-reflecting servo type, and the parallel type, have been described so far, and conventional bilateral control, including these types, has Problems 1 through 10 as follows:

[Problem 1] A problem common among the force-reflecting type, the force-reflecting servo type, and the parallel type.

Information about the slave working force $f_s$ is required for control, and therefore, difficulty is found in application to a system in which the working force sensor cannot be mounted on the slave robot.

[Problem 2] A problem common between the position-symmetric type and the force-reflecting type.

Control drives the system in accordance with displacement error of the master robot, and therefore, it is necessary to set the inertia and the friction of the master robot as low as possible, such that displacement error of the master robot can be readily generated by human power, i.e., high back-drivability is ensured. Accordingly, it is requisite for the master robot to be a powerless and fragile mechanism with a low reduction ratio.

[Problem 3] A problem common among the position-symmetric type, the force-reflecting type, the force-reflecting servo type, and the parallel type.

Control causes the master dynamics to influence the master operating force $f_m$, and therefore, for improvements to operability as well, it is necessary to set the inertia and the friction of the master robot as low as possible. Accordingly, it is desirable for the master robot to be a powerless and fragile mechanism with a low reduction ratio.

[Problem 4] A problem common between the force-reflecting type and the force-reflecting servo type.

Control is based on the norm of transparency and therefore does not cause the slave dynamics to influence the master operating force $f_m$, so that the operator's skills are not expected to be improved by taking advantage of feeling the sense of the slave dynamics, and further, slave robot operation is not expected to become either more efficient or optimized.

[Problem 5] A problem common between the force-reflecting servo type and the parallel type.

Despite control being based on the norm of transparency, transparency might not be achieved if necessary stability is sought to be achieved because transparency and stability are in a trade-off relationship.

[Problem 6] A problem common among the force-reflecting type, the force-reflecting servo type, and the parallel type.

If the working force sensor disposed on the slave robot contacts a hard environment, there is a risk that the system might be destabilized (a problem with contact stability of the slave robot). To prevent this, it is conceivable to decrease the force control gain $K_f$ to a sufficient degree, or switch control laws in accordance with whether the slave robot is in contact with the environment, but the former reduces operability and transparency, whereas the latter results in complex implementation.

[Problem 7] A problem common among the position-symmetric type, the force-reflecting type, the force-reflecting servo type, and the parallel type.

The slave robot and the master robot are always connected bidirectionally, and therefore, there is a risk that unstable behavior might be excited in the system solely by an external force $-f_s$ applied to the slave robot, even if the operator is not manipulating the master robot.

[Problem 8] A problem common among the position-symmetric type, the force-reflecting type, the force-reflecting servo type, and the parallel type.

A command value for the slave robot is position-related, and the slave dynamics need to be cancelled by positional control, which imposes a large burden on the control system. In addition, the control law based on the positional control does not necessarily allow another control law to be superimposed thereon.

[Problem 9] A problem common among the force-reflecting type, the force-reflecting servo type, and the parallel type.

In controlling the position of the slave robot, if the output of a slave actuator becomes insufficient, so that slave driving force $r_s$ is saturated, error between master displacement and slave displacement might increase, resulting in reduced operability.

[Problem 10] A problem common among the position-symmetric type, the force-reflecting type, the force-reflecting servo type, and the parallel type.

When positional control in the work coordinate system is applied to the slave robot, a singularity problem might arise, so that control failure might occur when the posture of the slave robot approaches a singularity.

As new bilateral control capable of neatly solving these problems, the present inventor proposes the basic configuration of "force-projecting bilateral control" in Patent Document 1. In the force-projecting type, an operating force sensor for measuring the master operating force $f_m$ is disposed at the operating end of the master robot, and the measured master operating force $f_m$ is "projected" to the slave driving force $\tau_s$. In the force-projecting bilateral control, the master control law and the slave control law are, for example, as shown below:

[Expression 18]

$$\tau_m = J_m^T K_p (S_p x_s - x_m) \tag{18};$$

[Expression 19]

$$\tau_6 = J_d^T S_f f_m \tag{19}.$$

From the slave dynamics (2) and the slave control law (19), the following expression can be obtained.

[Expression 20]

$$f_m = S_f^{-1} J_s^{-T}(M_s \ddot{q}_s + r_s) + S_f^{-1} f_s \tag{20}$$

In this manner, in the case of the force-projecting bilateral control, the influence of the slave dynamics and the slave working force $f_s$ are added to the master operating force $f_m$ by a factor of $S_f^{-1}$. That is, the force-projecting bilateral control is an approach to measure the master operating force $f_m$ applied to the master robot by the operator, rather than the slave working force $f_s$ applied to the environment (i.e., a work object) by the slave robot, and allow the master to pass force information forward to the slave while allowing the slave to feed displacement information back to the master.

The force-projecting bilateral control has Characteristics 1 through 10 as shown below:

[Characteristic 1] Applicable to even a system in which the working force sensor cannot be mounted on the slave robot, because no information about the slave working force $f_s$ is needed.

[Characteristic 2] Not requiring the master robot to have backdrivability because the system is driven by the master operating force $f_m$ applied to the master robot by the operator, rather than in accordance with displacement error of the master robot, so that the master robot can be rendered as a mechanism which is robust enough to withstand human power, and is also highly accurate and powerful.

[Characteristic 3] Being control that does not cause the master dynamics to influence the master operating force $f_m$, so that there is no need to set the inertia and the friction of the master robot low in order to improve operability. Accordingly, for a different reason from that for Characteristic 2, the master robot can be rendered as a mechanism which is robust enough to withstand human power, and is also highly accurate and powerful.

[Characteristic 4] Being control that is not based on the norm of transparency and therefore causes the slave dynamics to influence the master operating force $f_m$, so that the operator's skills are expected to be improved by taking advantage of feeling the sense of the slave dynamics, and further, slave robot operation is expected to become more efficient and optimized.

[Characteristic 5] Being control that is based on the norm of "projectivity" as defined by the present inventor in Patent Document 2, rather than transparency; projectivity is not in a trade-off relationship with stability, and therefore can be achieved with a necessary accuracy independently of stability.

[Characteristic 6] Being control that allows the slave robot to feed displacement information, rather than force information, back to the master robot, so that there is no problem with contact stability of the slave robot.

[Characteristic 7] No risk of unstable behavior being excited in the system solely by an external force $-f_s$ applied to the slave robot because the connection from the master robot to the slave robot is terminated (i.e., the connection therebetween changes from bilateral to unilateral) unless the operator applies the master operating force $f_m$ to the master robot.

[Characteristic 8] The command value for the slave robot is related to drive power (force and torque), rather than position-related, which facilitates the implementation of the slave control law, and imposes little burden on the control system. The control is based on drive power, and therefore, any type of control based on drive power can be superimposed on the slave control law.

[Characteristic 9] The master robot is rendered as a mechanism which is robust enough to withstand human power, so that even if the output of the slave actuator becomes insufficient in controlling the power of driving the slave robot, resulting in saturation of the slave driving force $\tau_s$, there is little possibility that the output of a master actuator is saturated in positional control of the master robot, so that master displacement and slave displacement can be matched with a sufficient accuracy, resulting in no reduction of operability.

[Characteristic 10] The slave robot is not position-controlled but is controlled in terms of drive power, and therefore, no singularity problem occurs even if the control in the work coordinate system is applied, so that control failure does not occur even if the posture of the slave robot approaches a singularity.

PRIOR ART DOCUMENTS

Patent Documents

Patent Document 1:Japanese Patent No. 5105450
Patent Document 2:Japanese Patent Application No. 2013-230820 (specification)
Patent Document 3:Japanese Patent Application No. 2013-169669 (specification)

Non-Patent Documents

Non-Patent Document 1: Miyazaki and Hagihara, "Parallel Control Method for a Bilateral Master-Slave Manipulator", Journal of the Robotics Society of Japan, Vol. 7, No. 5, pp. 446-452, 1989
Non-Patent Document 2: Yoshinada, "A Study on the Large-Scale Bilateral Manipulator", Tokyo Institute of Technology Doctoral Thesis, 2012
Non-Patent Document 3: Ryo Kikuuwe, Satoshi Yasukouchi, Hideo Fujimoto, and Motoji Yamamoto, "Proxy-Based Sliding Mode Control: A Safer Extension of PID Position Control," IEEE Transactions on Robotics, Vol. 26, No. 4, pp. 670-683, 2010

DISCLOSURE OF THE INVENTION

Problems to be Solved by the Invention

As described above, the force-projecting bilateral control proposed by the present inventor in Patent Document 1 has a number of advantages which the conventional bilateral control lacks, but on the other hand, the force-projecting bilateral control has the following problems A through E to be solved.

[Problem A] There is a risk that unstable behavior might be excited in the system (a problem with contact stability of the master robot) as a result of the operating force sensor of the master robot contacting a hard environment or as a result of an irregular impact being applied to the operating force sensor.

[Problem B] Stability of bilateral control is not taken into consideration, and therefore there is a possibility where the scale ratio $S_p$ of displacement from the slave robot to the master robot and the scale ratio $S_f$ of force from the master robot to the slave robot cannot be set high enough to ensure stability.

[Problem C] Sensing abilities of a human who is the operator and the characteristics of the mounted operating force sensor and displacement sensor are not taken into consideration, and therefore, control design cannot necessarily be said to be adapted to human sensing abilities.

[Problem D] In performing control in the work coordinate system, operability might be impaired extremely at and around a singularity for the master robot.

[Problem E] In order for the operator to properly feel the sense of dynamic behavior (i.e., dynamics) of link mechanisms included in the slave robot and dynamic behavior (i.e., dynamics) of the environment (i.e., a work object), the slave robot is required to have high backdrivability.

It should be noted that even if the slave robot does not have backdrivability, the force-projecting bilateral control does not fail, and the operator merely feels that there is no backdrivability as a part of the slave dynamics. However, in the case where the slave robot does not have high backdrivability, more specifically, in the case where backdrivability is lost mainly at an internal mechanism (such as a reducer) of the slave actuator included in a joint of the slave robot, it is difficult for the operator to feel the sense of the dynamics of the slave robot outside the slave actuator, i.e., the dynamics of the link mechanism and the environment (i.e., a work object). Consequently, this produces an undesirable result that Characteristic 4 of the force-projecting bilateral control is lost in part or in whole.

Among Problems A through E above, Problems A to C can be solved by the approach proposed by the present inventor in Patent Document 3. Also, Problem D can be solved by the approach proposed by the present inventor in Patent Document 2. However, as for Problem E, there has not yet been proposed any preferable solution.

The present invention has been achieved under the above circumstances, with a problem thereof being to provide a master-slave system capable of improving low backdrivability of a slave robot due to a mechanical structure thereof.

Solution to the Problems

One of the characteristics of the basic force-projecting bilateral control proposed by the present inventor in Patent Document 1 is that there is no need for a working force sensor for measuring the slave working force applied to the environment by the slave robot. The reason for such a configuration is that in a considerable number of master-slave systems, there is difficulty in mounting the working force sensor at the working end of the slave robot.

However, it is not that the force sensor cannot be mounted at all on the slave robot in any master-slave system, and for the following reasons (1) and (2), it is not always difficult to mount a single-axis force sensor, rather than a multi-axis force sensor, on a portion of the slave robot other than the working end.

(1) When the working end of the slave robot contacts a hard environment, the working end directly receives the impact, but in actuality, impact on other portions of the slave robot is absorbed by viscoelasticity inherent to links coupling such portions to the working end, even if the links are rigid.

(2) The multi-axis force sensor that is to be mounted at the working end has a complex mechanism and hence is delicate and expensive, whereas the single-axis force sensor has a simple mechanism and is generally more robust and less expensive than the multi-axis force sensor. In fact, single-axis force sensors which can be used as so-called load cells or torque sensors even in a harsh environment are commercially available.

The present inventor conducted exhaustive studies and completed a master-slave system to solve the above problems, on the basis of the findings from the studies.

Specifically, the present invention is directed to a master-slave system having a master robot and a slave robot and being subjected to bilateral control, the master robot being an admittance-type haptic device manipulated by an operator, the slave robot being at least electrically connected to the master robot and having portions at least other than the trunk operating mechanically independent of the master robot, the system including:

at least one master actuator for generating a master driving force to control the master robot in terms of joint displacement; at least one slave actuator for generating a slave driving force to control the slave robot in terms of driving force; at least one master displacement sensor for measuring a master displacement for the master robot; at least one slave displacement sensor for measuring a slave displacement for the slave robot; at least one operating force sensor for measuring a master operating force applied to the master robot by the operator; at least one effective driving force sensor for measuring a slave effective driving force actually acting on a terminal output axis of the slave actuator; a master target displacement calculating device for calculating a master target displacement which is a target value for the master displacement, on the basis of the slave displacement; and a slave target effective driving force calculating device for calculating a slave target effective driving force which is a target value for the slave effective driving force, on the basis of the master operating force, wherein, the master actuator is adapted to generate the master driving force on the basis of the master target displacement and the master displacement, whereas the slave actuator is adapted to generate the slave driving force on the basis of the slave target effective driving force and the slave effective driving force, thereby (1) eliminating the need for a working force sensor provided at a working end of the slave robot and adapted for the bilateral control to measure a slave working force applied to the environment by the slave robot and (2) allowing the operator to feel the sense of external dynamics of the slave actuator without feeling the sense of master dynamics of the master robot and internal dynamics of the slave actuator.

In a specific example of the master-slave system, it is conceivable that the slave actuator includes a drive source for generating the slave driving force and driving force-load matching means or driving force transmitting means provided on an output axis of the drive source, and the effective driving force sensor is a single-axis force sensor capable of measuring the slave effective driving force for a single axis and provided on an output axis of the driving force-load matching means or the driving force transmitting means, the output axis serving as the terminal output axis.

Effect of the Invention

The present invention renders it possible to provide a master-slave system capable of improving low backdrivability of a slave robot due to a mechanical structure thereof.

MODE FOR CARRYING OUT THE INVENTION

Hereinafter, an example of the present invention will be described with reference to the drawings.

Example

Figure 1:
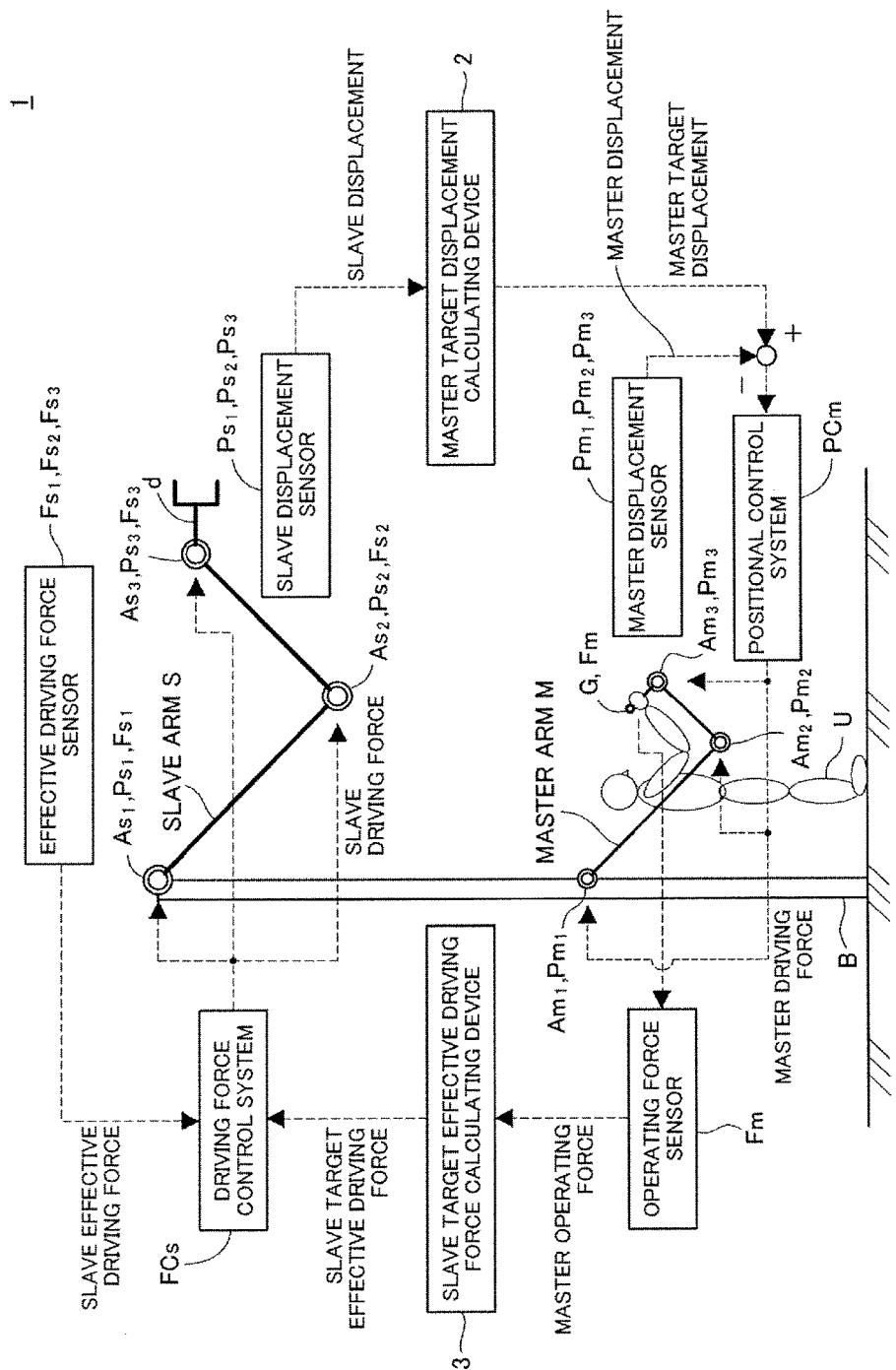
FIG. 1 is a schematic diagram of a force-projecting type master-slave system according to the present invention.

As shown in FIG. 1, a force-projecting type master-slave system 1 according to an example of the present invention (more precisely, a master-slave system to which force-projecting bilateral control is applied) includes a master robot with a master arm M and a slave robot with a slave arm S, the master arm M and the slave arm S being provided at different positions on a trunk B and electrically connected to each other in a manner as will be described below. In the force-projecting type master-slave system 1, the master arm M is an admittance-type haptic device manipulated by an operator U.

The master arm M and the slave arm S respectively have a grip G, which serves as an operating end, and a working end d at one end, and are joined at the other end to different positions on the trunk B. Moreover, each of the master arm M and the slave arm S has two links and also has a joint (e.g., a rotational joint) at each of the end connected to the grip G or the working end d, the other end connected to the trunk B, and the connection between the links. Accordingly, in the present example, each of the master arm M and the slave arm S has three degrees of freedom.

Provided at the respective joints of the master arm M are master displacement sensors $Pm_1$, $Pm_2$, and $Pm_3$ and master actuators $Am_1$, $Am_2$, and $Am_3$, whereas provided at the respective joints of the slave arm S are slave displacement sensors $Ps_1$, $Ps_2$, and $Ps_3$, slave actuators $As_1$, $As_2$, and $As_3$, and effective driving force sensors $Fs_1$, $Fs_2$, and $Fs_3$. In addition, the grip G is provided with an operating force sensor $F_m$. Further, the force-projecting type master-slave system 1 includes a positional control system $PC_m$, a master target displacement calculating device 2, a driving force control system $FC_s$, and a slave target effective driving force calculating device 3, as shown in FIG. 1.

Herein, the master arm M, the master displacement sensors $Pm_1$, $Pm_2$, and $Pm_3$, the master actuators $Am_1$, $Am_2$, and $Am_3$, the operating force sensor $F_m$ (or the grip G), and the positional control system $PC_m$ are included in the master robot, and the slave arm S, the slave displacement sensors $Ps_1$, $Ps_2$, and $Ps_3$, the slave actuators $As_1$, $As_2$, and $As_3$, the effective driving force sensors $Fs_1$, $Fs_2$, and $Fs_3$, and the driving force control system $FC_s$ are included in the slave robot. Moreover, herein, in some cases, the positional control system $PC_m$ is deemed to be integrated with the "master actuators" without distinguishing the positional control system $PC_m$ from the master actuators $Am_1$, $Am_2$, and $Am_3$, and the driving force control system $FC_s$ is deemed to be integrated with the "slave actuators" without distinguishing the driving force control system $FC_s$ from the slave actuators $As_1$, $As_2$, and $As_3$.

The operating force sensor $F_m$ is provided in the master arm M, and measures a master operating force $f_m$ from the operator U. The master displacement sensors $Pm_1$, $Pm_2$, and $Pm_3$ are provided at the joints of the master arm M, and measure master displacements $q_m$ and $x_m$. The slave displacement sensors $Ps_1$, $Ps_2$, and $Ps_3$ are provided at the joints of the slave arm S, and measure slave displacements $q_s$ and $x_s$. Moreover, the effective driving force sensors $Fs_1$, $Fs_2$, and $Fs_3$ are provided at the joints of the slave arm S, and measure a slave effective driving force r to be described later.

The master target displacement calculating device 2 calculates master target displacements, which are target values for the master displacements $q_m$ and $x_m$, on the basis of the measured slave displacements $q_s$ and $x_s$. Moreover, the slave target effective driving force calculating device 3 calculates a slave target effective driving force $\tau_{sad}$, which is a target value for the slave effective driving force $\tau_{sa}$, on the basis of the measured master operating force $f_m$.

The slave actuators $As_1$, $As_2$, and $As_3$ are provided at the joints of the slave arm S, and generate the slave driving force $\tau_s$ through the slave driving force control system $FC_s$ on the basis of the slave target effective driving force $\tau_{sad}$ and the slave effective driving force $\tau_{sa}$, whereby the slave arm S is controlled in terms of driving force. On the other hand, the master actuators $Am_1$, $Am_2$, and $Am_3$ are provided at the joints of the master arm M, and generate a master driving force $\tau_m$ on the basis of the master displacements $q_m$ and $x_m$ and the master target displacements, whereby the master arm M is position-controlled. More specifically, the master actuators $Am_1$, $Am_2$, and $Am_3$ generate the master driving force $\tau_m$ through the positional control system $PC_m$, such that the deviation between a signal from each of the master displacement sensors $Pm_1$, $Pm_2$, and $Pm_3$ and a signal from the master target displacement calculating device 2 is 0.

In this manner, in the force-projecting type master-slave system 1, the slave actuators $As_1$, $As_2$, and $As_3$, which generate the slave driving force $\tau_s$, control the slave arm S in terms of driving force, whereas the master actuators $Am_1$, $Am_2$, and $Am_3$, which generate the master driving force $\tau_m$, position-control the master arm M.

Figure 2:
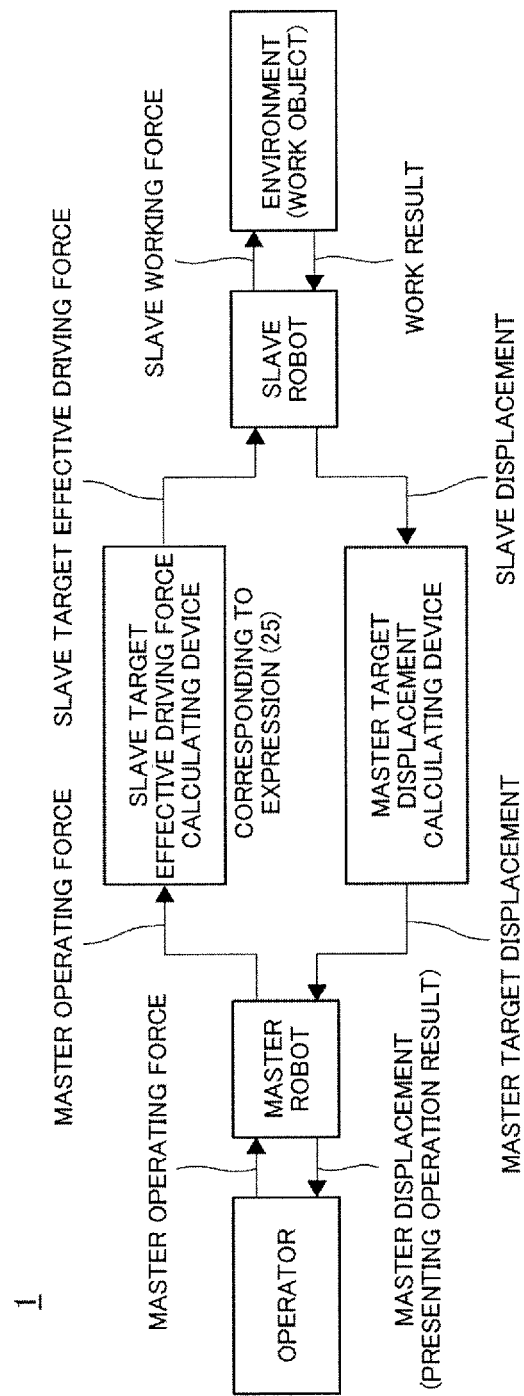
FIG. 2 is a control block diagram of the force-projecting type master-slave system according to the present invention.

FIG. 2 represents the above configuration in a control block diagram. In FIG. 2, the master robot includes the master arm M, the master displacement sensors $Pm_1$, $Pm_2$, and $Pm_3$, the master actuators $Am_1$, $Am_2$, and $Am_3$, the operating force sensor $F_m$ (or the grip G), and the positional control system $PC_m$. Also, the slave robot includes the slave arm S, the slave displacement sensors $Ps_1$, $Ps_2$, and $Ps_3$, the slave actuators $As_1$, $As_2$, and $As_3$, the effective driving force sensors $Fs_1$, $Fs_2$, and $Fs_3$, and the driving force control system $FC_s$. As is apparent from the figure, in the force-projecting type master-slave system 1 according to the present example, the master operating force $f_m$ applied to the master robot by the operator U is measured so that force information is passed forward from the master to the slave, and displacement information is fed back from the slave to the master.

Figure 4:
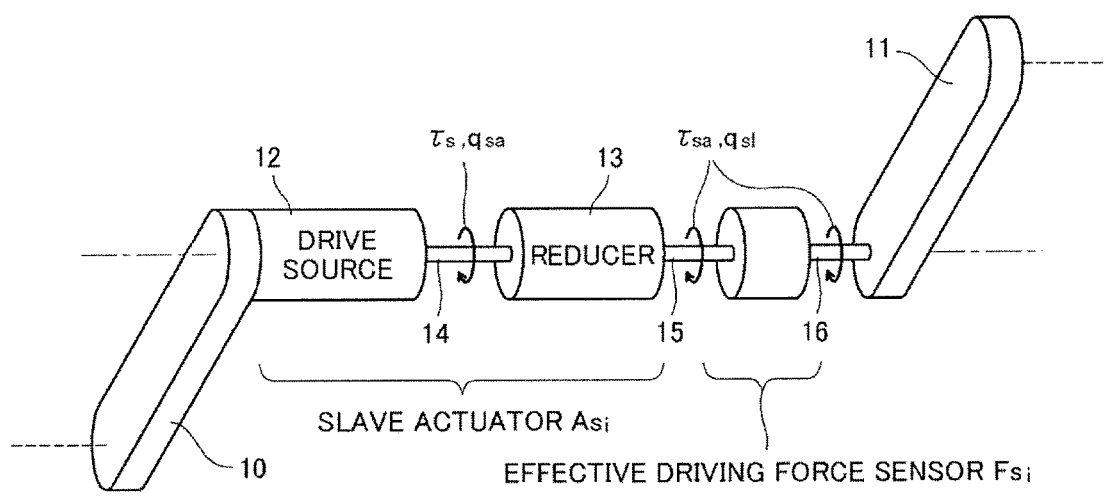
FIG. 4 is a schematic view of a joint of the slave robot in the force-projecting type master-slave system according to the present invention.

FIG. 4 is a schematic view of an i'th joint (where i=1, 2, . . . , n; n being a positive integer) of a slave arm S having n degrees of freedom, the i'th joint being provided between an (i−1)'th link 10 and an i'th link 11 positioned on the side of the working end d relative to the link 10. As shown in the figure, a slave actuator $As_i$ for the i'th joint includes a drive source 12 for generating a slave driving force $\tau_s$, and a reducer 13 provided on an output axis 14 of the drive source 12. Although not shown in the figure, the base of the reducer 13, as with the base of the drive source 12, is fixed to the link 10. The reducer 13 has an output axis, which serves as a terminal output axis 15 of the slave actuator $As_i$ and is directly coupled to a joint axis 16 of a link mechanism consisting of the links 10 and 11.

In this case, the dynamics of the slave robot represented by Expression (2) is divided into internal dynamics (21) of the slave actuator $As_i$ including the reducer 13, and external dynamics (22) of the slave actuator $As_i$:

[Expression 21]

$$\tau_s = M_{sa}\ddot{q}_{sa} + r_{sa} + J_{sa}^T \tau_{sa} \quad (21);$$

[Expression 22]

$$\tau_{sa} = M_{sl}\ddot{q}_{sl} + r_{sl} + J_{sl}^T f_s \quad (22),$$

where $q_{sa}(t)$ is the displacement of the slave actuator $As_i$ (i.e., the displacement of the output axis 14) relative to the (i−1)'th link 10, $q_{sl}(t)$ is the displacement of the terminal output axis 15 (i.e., the displacement of the joint axis 16 of the i'th link 11) similarly relative to the (i−1)'th link 10, $M_{sa}$ is an inertia matrix for the slave actuator $As_i$, $M_{sl}$ is an inertia matrix for the link mechanism of the slave arm S, and $r_{sa}$ and $r_{sl}$ are remainder terms aggregating effects other than inertia. Moreover, $J_{sa}$ and $J_{sl}$ are Jacobian matrices having the following relationship with $J_s$.

[Expression 23]

$$J_s^T = J_{sa}^T J_{sl}^T \quad (23)$$

For the remainder term $r_{sa}$, independent variables are specified as $r_{sa}(\dot{q}_{sa}, q_{sa}, \dot{q}_{sl}, q_{sl})$, and for the remainder term $r_{sl}$, independent variables are specified as $r_{sl}(\dot{q}_{sl}, q_{sl})$. However, it should be noted that depending on the configuration of the slave actuator $As_i$, the remainder terms $r_{sa}$ and $r_{sl}$ are affected only by some of the independent variables and are not affected by the rest of the variables.

In the configuration shown in FIG. 4 where the terminal output axis 15 of the slave actuator $As_i$ and the joint axis 16 of the link mechanism are directly coupled, the internal dynamics and the external dynamics of the slave actuator $As_i$ are coupled by the driving force of the terminal output axis 15. In the present invention, such a driving force is referred to as a slave effective driving force $\tau_{sa}$. The slave driving force $\tau_s$ is a driving force generated by the drive source 12 in the slave actuator $As_i$, whereas the slave effective driving force $\tau_{sa}$ is a driving force which is obtained by subtracting loss due to the dynamics of the reducer 13 in the slave actuator $As_i$ from the slave driving force $\tau_s$ and actually exerted to the outside of the slave actuator $As_i$.

The slave effective driving force $\tau_{sa}$ can be measured with accuracy by disposing a single-axis force sensor on the terminal output axis 15 of the slave actuator $As_i$ as an effective driving force sensor $Fs_i$. In the case where the slave arm S has three degrees of freedom, a single-axis force sensor is disposed at each of the three joints, as shown in FIG. 1. In other words, in the case of the force-projecting type master-slave system 1 according to the present example, a sensor group consisting of the same number of single-axis force sensors as the number of joints is disposed in the slave arm S.

The force-projecting type master-slave system 1 according to the present example uses, for example, slave control laws (24) and (25). These include effective driving force error servo control in addition to the slave control law in Expression (19).

[Expression 24]

$$\tau_s = J_{sa}^T \tau_{sad} + J_{sa}^T K_f (\tau_{sad} - \tau_{sa}) \quad (24)$$

[Expression 25]

$$\tau_{sad} = J_{si}^T S f_m \quad (25)$$

On the other hand, the master control law is the same as in Expression (18). Herein, the force-projecting bilateral control according to the slave control laws (24) and (25) and the master control law (18) is referred to specifically as the "force-projecting servo bilateral control".

From the internal dynamics (21) and the external dynamics (22) of the slave actuator $As_i$ and the slave control laws (24) and (25), the following expression can be obtained.

[Expression 26]

$$f_m = \\ S_f^{-1} J_{sl}^{-T} (I + K_f)^{-1} J_{sa}^{-T} (M_{sa} \ddot{q}_{sa} + r_{sa}) + S_f^{-1} J_{sl}^{-T} (M_{sl} \ddot{q}_{sl} + r_{sl}) + S_f^{-1} f_s \quad (26)$$

Furthermore, by increasing the force control gain $K_f$ in Expression (26) to a sufficient degree, the following expression can be obtained.

[Expression 27]

$$f_m \simeq S_f^{-1} J_{si}^{-T} (M_{si} \ddot{q} + r_{si}) + S_f^{-1} f_s \quad (27)$$

Expression (27) indicates that by providing the effective driving force sensor $Fs_i$, the operator U is allowed to feel only the sense of the external dynamics (22) of the slave actuator $As_i$ by a factor of $S_f^{-1}$ without feeling the sense of the internal dynamics (21) of the slave actuator $As_i$.

It should be noted that the following expression can be obtained by making a setting of force control gain $K_f=0$ in Expression (26).

[Expression 28]

$$f_m = S_f^{-1} J_s^{-T} (M_s \ddot{q}_s + r_s) + S_f^{-1} f_s \quad (28)$$

Expression (28) is the same as Expression (20) for the basic configuration of the force-projecting bilateral control proposed by the present inventor in Patent Document 1. More specifically, as can also be appreciated from Expressions (24) and (25), the force-projecting servo bilateral control resolves to the basic configuration of the force-projecting bilateral control by making a setting of force control gain $K_f=0$.

Stability of bilateral control decreases as the force control gain $K_f$ increases. Therefore, in actuality, it is difficult to eliminate the influence of the internal dynamics (21) of the slave actuator $As_i$ on the master operating force $f_m$, as represented by Expression (27). However, even if the influence of the internal dynamics (21) of the slave actuator $As_i$ is not eliminated, it is still beneficial to reduce the influence. More specifically, in the case of the force-projecting servo bilateral control, internal inertia and friction of the slave actuator $As_i$ can be reduced by increasing the force control gain $K_f$ as much as possible within the extent that stability can be ensured. In other words, in the case of the force-projecting servo bilateral control, a non-backdrivable slave robot can be rendered backdrivable by increasing the force control gain $K_f$ as much as possible within the extent that stability can be ensured.

Here, in Patent Document 2, the present inventor defines the state where ideal projectivity is achieved, i.e., "exoprojection", as shown below.

[Expression 29]

$$x_m = S_p x_s \quad (29)$$

[Expression 30]

$$J_s^T S f_m = \tau_s \quad (30)$$

In the force-projecting servo bilateral control, the slave control laws (24) and (25) are used on the basis of the idea that operability can be improved by modifying Expression (30) to the following expression and thereby cancelling the internal dynamics of the slave actuator $As_i$.

[Expression 31]

$$J_{sl}^T S f_m = \tau_{sa} \quad (31)$$

Furthermore, in the case of the force-projecting servo bilateral control, projectivity can be achieved in accordance with the following expression obtained from the slave control laws (24) and (25) and the internal dynamics (21) of the slave actuator $As_i$.

[Expression 32]

$$J_{sl}^T S f_m = \tau_{sa} + (I + K_f)^{-1} J_{sa}^{-T} (M_{sa} \ddot{q}_{sa} + r_{sa}) \quad (32)$$

By making a setting of force control gain $K_f \to \infty$, Expression (32) becomes equal to Expression (31). On the other hand, by making a setting of force control gain $K_f=0$, Expression (32) becomes equal to Expression (30). That is, in the case of the force-projecting servo bilateral control, by adjusting the force control gain $K_f$ between 0 and $\infty$, projectivity can be achieved to be intermediate between the exoprojection represented by Expression (30) and the exoprojection represented by Expression (31).

Figure 3:
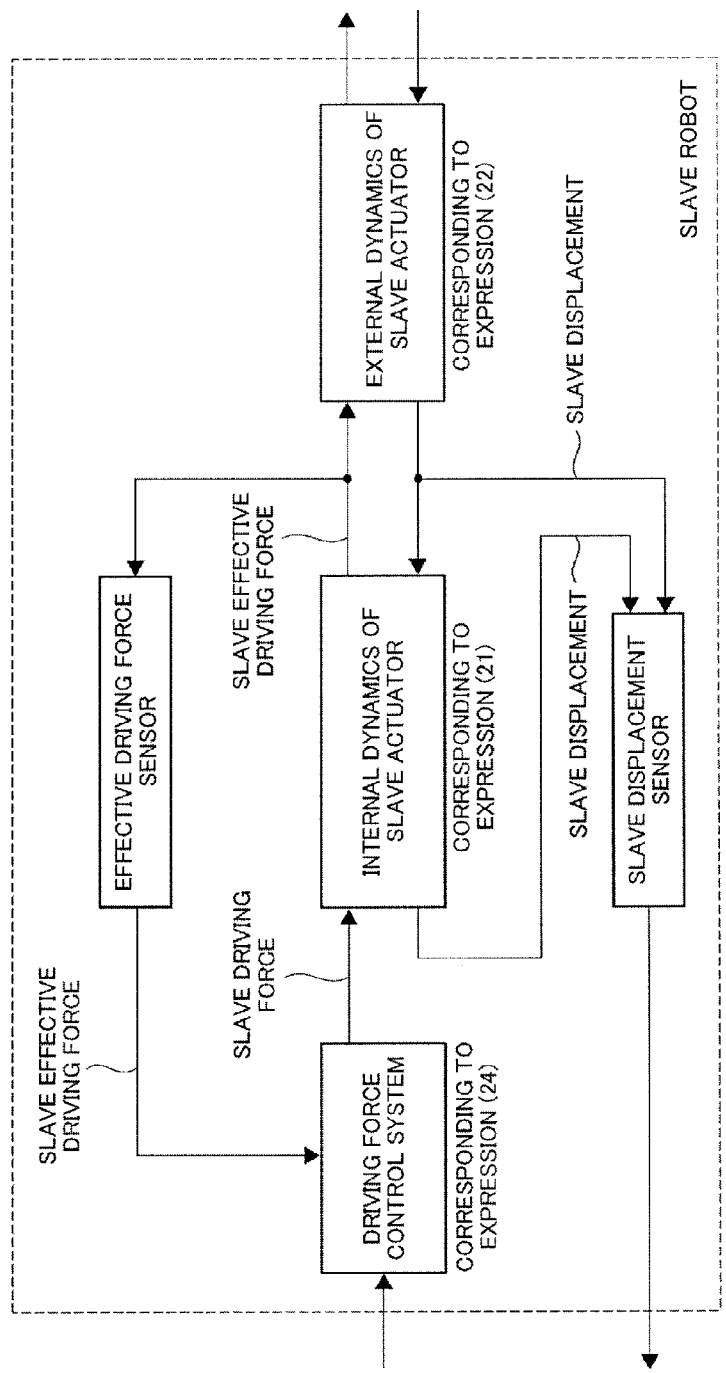
FIG. 3 is a detailed control block diagram of a slave robot in the force-projecting type master-slave system according to the present invention.

The slave-side configuration of the force-projecting (or force-projecting servo) type master-slave system 1 according to the present example can be summarized as follows:

The slave target effective driving force calculating device calculates the slave target effective driving force $\tau_{sad}$, which is a target value for the slave effective driving force $\tau_{sa}$, on the basis of the master operating force $f_m$, as shown in FIG. 2 and Expression (25);

The driving force control system of the slave robot makes the slave actuator generate the slave driving force $\tau_s$ on the basis of the slave effective driving force $\tau_{sa}$ and the slave target effective driving force $\tau_{sad}$, as shown in FIG. 3 and Expression (24); and The effective driving force sensor measures the slave effective driving force $\tau_{sa}$ which links the internal dynamics (corresponding to Expression (21)) and the external dynamics (corresponding to Expression (22)) of the slave actuator, as shown in FIG. 3.

Comparative Example 1

Next, the force-projecting servo bilateral control according to the present invention will be compared with force-reflecting bilateral control according to Comparative Example 1 in which the slave effective driving force $\tau_{sa}$ measured by the effective driving force sensor, rather than the slave working force $f_s$ measured by the working force sensor, is reflected in the master driving force.

In the case of the force-reflecting bilateral control according to Comparative Example 1, the master control law can be represented by an expression below. Note that the slave control law is the same as in Expression (6).

[Expression 33]

$$\tau_m = -J_m^T S_f^{-1} J_{si}^{-T} \tau_{sa} \tag{33}$$

From the master dynamics (1), the external dynamics (22) of the slave actuator, and the master control law (33), the following expression can be obtained.

[Expression 34]

$$f_m = J_m^{-T}(M_m \ddot{q}_m + r_m) + S_f^{-1} J_{sl}^{-T}(M_{sl} \ddot{q}_{sl} + r_{sl}) + S_f^{-1} f_s \tag{34}$$

In the case of the force-reflecting bilateral control according to the present comparative example also, the influence of the master dynamics is added to the master operating force $f_m$ as is, and the slave working force $f_s$ is also added by a factor of $S_f^{-1}$. Moreover, the influence of the slave dynamics is also added to the master operating force $f_m$ by a factor of $S_f^{-1}$.

In the case of the force-reflecting bilateral control according to the present comparative example, as in the case of the basic configuration of the force-projecting bilateral control proposed by the present inventor in Patent Document 1, the operator U can feel the sense of the slave dynamics, so that the aforementioned effect of Characteristic 4 can be achieved. In this regard, Non-Patent Document 2 notes that operability of a power-amplifying master-slave system was improved by presenting the inertial force of the slave dynamics to the operator U using an approach similar to the force-reflecting bilateral control according to the present comparative example.

However, in the case of the force-reflecting bilateral control according to the present comparative example, the operator U still feels the influence of the master dynamics, as described above. Accordingly, the force-reflecting bilateral control according to the present comparative example does not solve Problems 2, 3, and 7 to 10 inherent to the conventional bilateral control, although Problems 1 and 4 are solved. Moreover, the force-reflecting bilateral control according to the present comparative example uses the Jacobian matrix $J_{sl}^{-T}$ in the master control law (33), and therefore, there is a possibility that when the posture of the slave robot approaches a singularity, the master control law (33) might fail despite driving force control.

Comparative Example 2

Next, the force-projecting servo bilateral control according to the present invention will be compared with force-reflecting servo bilateral control according to Comparative Example 2 in which the slave effective driving force $\tau_{sa}$ measured by the effective driving force sensor, rather than the slave working force $f_s$ measured by the working force sensor, is reflected in the master driving force, and a force error servomechanism is configured on the master side using the master operating force $f_m$ measured by the operating force sensor.

In the case of the force-reflecting servo bilateral control according to Comparative Example 2, the master control law is as represented by an expression below. Note that the slave control law is the same as in Expression (6).

[Expression 35]

$$\tau_m = J_m^T K_f (f_m - S_f^{-1} J_{sl}^{-1} \tau_{sa}) - J_m^T S_f^{-1} J_{sl}^{-T} \tau_{sa} \tag{35}$$

From the master dynamics (1), the external dynamics (22) of the slave actuator, and the master control law (35), the following expression is obtained.

[Expression 36]

$$f_m = (I + K_f)^{-1} J_m^{-T}(M_m \ddot{q}_m + r_m) + S_f^{-1} J_{sl}^{-T}(M_{sl} \ddot{q}_{sl} + r_{sl}) + S_f^{-1} f_s \tag{36}$$

Furthermore, the following expression can be obtained by sufficiently increasing the force control gain $K_f$ in the above expression.

[Expression 37]

$$f_m = S_f^{-1} J_{sl}^{-T}(M_{sl} \ddot{q}_{sl} + r_{sl}) + S_f^{-1} f_s \tag{37}$$

Expression (37) is exactly the same as Expression (27) for the force-projecting servo bilateral control according to the present invention. Therefore, ideally, the force-reflecting servo bilateral control according to the present comparative example, as with the force-projecting servo bilateral control according to the present invention, renders it possible to realize exoprojection.

However, increasing the force control gain $K_f$ reduces stability of bilateral control. Accordingly, in actuality, the force control gain $K_f$ cannot be set to ∞. In the case where the force control gain $K_f$ is not ∞, the master operating force $f_m$ of the force-reflecting servo bilateral control according to the present comparative example is influenced by the master dynamics (i.e., the first term of the right-hand side of Expression (36)), whereas the master operating force $f_m$ of the force-projecting servo bilateral control according to the present invention is influenced by the internal dynamics of the slave actuator (i.e., the first term of the right-hand side of Expression (26)).

In this manner, for both the force-projecting servo bilateral control according to the present invention and the force-reflecting servo bilateral control according to the present comparative example, projectivity deviates from the exoprojection represented by Expression (31) as the force control gain $K_f$ decreases from ∞. However, the former transitions from the exoprojection represented by Expression (31) to the exoprojection represented by Expression (30), whereas the latter deviates from the exoprojection represented by Expression (30) and also from the exoprojection represented by Expression (31), and increasingly influences the master robot, which is merely an operating device not to be deemed as an exoskeleton, rather than the slave robot, which is to be deemed as an exoskeleton. Therefore, from the viewpoint of projectivity, the former is expected to maintain high operability more than the latter is.

All in all, the force-reflecting servo bilateral control according to the present comparative example solves Problems 1 and 4 with the conventional bilateral control, but does not solve Problems 3, 5, and 7 to 10. Moreover, the force-reflecting servo bilateral control according to the present comparative example uses the Jacobian matrix $J_{sl}^{-T}$ in the master control law (35), and therefore, when the posture of the slave robot approaches a singularity, the master control law (35) might fail despite driving force control.

[Comparison where the Operator is not Manipulating the Master Robot]

In the case where the operator U is not manipulating the master robot, i.e., in the case where master operating force $f_m=0$, the master-slave system is driven solely by the external force $-f_s$. In the case of the force-reflecting bilateral control according to Comparative Example 1, the external force $-f_s$ is represented by the following expression based on Expression (34).

[Expression 38]

$$-f_s = S_f J_m^{-T}(M_m \ddot{q}_m + r_m) + J_{sl}^{-T}(M_{sl} \ddot{q}_{sl} + r_{sl}) \quad (38)$$

Furthermore, in the case of the force-reflecting servo bilateral control according to Comparative Example 2, the external force $-f_s$ is represented by the following expression based on Expression (36).

[Expression 39]

$$-f_s = S_f(I+K_f)^{-1} J_m^{-T}(M_m \ddot{q}_m + r_m) + J_{sl}^{-T}(M_{sl} \ddot{q}_{sl} + r_{sl}) \quad (39)$$

Expressions (38) and (39) indicate that in the case of both the bilateral control according to Comparative Example 1 and the bilateral control according to Comparative Example 2, as in the case where no slave effective driving force $\tau_{sa}$ is utilized, when the slave robot is receiving the external force $-f_s$, the master-slave system operates under the influence of the dynamics of the master robot, which is merely an operating device.

On the other hand, in the case of the force-projecting servo bilateral control according to the present invention, the external force $-f_s$ is represented by the following expression.

[Expression 40]

$$-f_s = J_{sl}^{-T}(I+K_f)^{-1} J_{sa}^{-T}(M_{sa} \ddot{q}_{sa} + r_{sa}) + J_{sl}^{-T}(M_{sa} \ddot{q}_{sl} + r_{sl}) \quad (40)$$

Expression (40) indicates that in the case of the force-projecting servo bilateral control according to the present invention, when the slave robot is receiving the external force $-f_s$, the master-slave system is not influenced by the dynamics of the master robot. More specifically, the above expression indicates that if the operator U does not apply the master operating force $f_m$ to the master robot, the connection from the master robot to the slave robot is automatically terminated, so that the master-slave system becomes unilateral regardless of the force control gain $K_f$.

It should be noted that Expression (40) also indicates that unlike the basic configuration of the force-projecting bilateral control where no slave effective driving force T is utilized, when an excessive external force $-f_s$ is applied, the internal dynamics of the slave actuator may vary significantly depending on the setting of the force control gain $K_f$. This means that the force-projecting servo bilateral control according to the present invention has a problem with contact stability of the slave robot, which is not the case of the basic configuration. Therefore, in the case of the force-projecting servo bilateral control according to the present invention, it is necessary to adjust the force control gain $K_f$ while heeding stability of the slave control law (24). However, this problem is merely a problem of force control stability with the slave robot alone, and can be solved more easily than the contact stability problem with the force-reflecting bilateral control and the force-reflecting servo bilateral control, which might destabilize force control that is performed via a bilateral loop.

[Points to be Noted]

The terms "master robot" and "slave robot" are used herein for convenience, but the present invention is not necessarily limited only to the application to typical and orthodox robots. The master-slave system and the bilateral control are expected to be used in a wide variety of applications, and the present invention can be applied to any electrical master-slave systems. For example, any systems called "X-by-Wire" are electrical master-slave systems. Accordingly, in the case where the bilateral control is used not only in master-slave robotic systems but also in X-by-Wire systems for vehicles, airplanes, vessels, and any other types of operable machine, the present invention can be applied without modification.

The terms "displacement" and "position" herein are intended to mean a generalized displacement and encompass a position and a posture in translation and rotation. Similarly, the term "force" is intended to mean a generalized force and encompass a translational force and a rotational force (or torque).

The "slave actuator" of the present invention is not limited to a narrowly defined actuator for generating a driving force, such as an electromagnetic motor, a hydraulic source, or a pneumatic source. In the present invention, the "slave actuator" is intended to mean the entirety of a broadly defined actuator unit which includes as internal dynamics mechanical means (driving force-load matching means) for providing impedance matching between driving force and load, such as a reducer, a hydraulic cylinder, or a pneumatic cylinder, or driving force transmitting means, such as gears, a timing belt, or a chain.

The "terminal output axis" of the present invention is intended to mean any axis directly connected to an adjacent link or working end, and is not limited to a rotating axis as shown in FIG. 4.

The "operating force sensor" and the "effective driving force sensor" of the present invention do not have to be hardware force sensors, and may be a means for estimating an operating force from the current of an electromagnetic actuator or the pressure of a hydraulic/pneumatic actuator, or a means for estimating an operating force from, for example, a signal of a displacement sensor using an observer or suchlike.

The "effective driving force sensor" of the present invention has been described as being attached to the terminal output axis of the actuator for the sake of convenience, but upon implementation, the "effective driving force sensor" may be a force (torque) sensor integrally provided in the actuator.

The specific control laws for various types of bilateral control are mere examples for the sake of explanation, and higher-level control laws can be used so long as the purpose of control remains the same. For example, the master control law (18) uses proportional control as a positional control method, but it is understood that high-level control methods such as PID control and proxy-based sliding mode control, which is an extended version of the PID control (see Non-Patent Document 3), can also be used. Similarly, as for the slave control laws (24) and (25), it is also possible to use an arbitrary control method which causes the slave effective driving force $\tau_{sa}$ to approach the slave target effective driving force $\tau_{sad}$.

Any type of control based on driving force control can be superimposed on the slave control laws (24) and (25). In particular, it is beneficial to superimpose another type of control on the slave control law (25), because the superimposed control is applied to the slave robot, which is backdrivable by virtue of reduced internal inertia and friction of the slave actuator.

In the force-projecting bilateral control, the result of operation is presented as displacement information, using a wide frequency range from DC at lower limit to about hundreds of Hz to 1 kHz at upper limit. The result of operation does not have to be presented by one type of actuator, and may be presented by a plurality of actuators capable of presenting different frequency ranges from each another. Conceivable examples of a combination of such actuators include a combination of large and small motors (i.e., a so-called macro-micro system) and a combination of a motor in charge of a low-frequency range and an oscillator, a speaker, a voice coil motor, or the like in charge of a high-frequency range.

DESCRIPTION OF THE REFERENCE CHARACTERS 1 master-slave system
2 master target displacement calculating device
3 slave target effective driving force calculating device
M master arm
S slave arm
$F_m$ operating force sensor
$FC_s$ driving force control system
$PC_m$ positional control system
$Am_1$ to $Am_3$ master actuator
$As_1$ to $As_3$ slave actuator
$Pm_1$ to $Pm_3$ master displacement sensor
$Ps_1$ to $Ps_3$ slave displacement sensor
$Fs_1$ to $Fs_3$ slave effective driving force sensor

The invention claimed is:

1. A master-slave system having a master robot and a slave robot and being subjected to bilateral control, the master robot being an admittance-type haptic device manipulated by an operator, the slave robot being at least electrically connected to the master robot and having portions at least other than a trunk operating mechanically independent of the master robot, the system comprising:
at least one master actuator for generating a master driving force to control the master robot in terms of joint displacement;
at least one slave actuator for generating a slave driving force to control the slave robot in terms of driving force;
at least one master displacement sensor for measuring a master displacement for the master robot;
at least one slave displacement sensor for measuring a slave displacement for the slave robot;
at least one operating force sensor for measuring a master operating force applied to the master robot by the operator;
at least one effective driving force sensor for measuring a slave effective driving force actually acting on a terminal output axis of the slave actuator;
a master target displacement calculating device for calculating a master target displacement which is a target value for the master displacement, on the basis of the slave displacement; and
a slave target effective driving force calculating device for calculating a slave target effective driving force which is a target value for the slave effective driving force, on the basis of the master operating force, wherein,
the master actuator is adapted to generate the master driving force on the basis of the master target displacement and the master displacement, whereas the slave actuator is adapted to generate the slave driving force on the basis of the slave target effective driving force and the slave effective driving force, thereby:
(1) eliminating a need for a working force sensor provided at a working end of the slave robot and adapted for the bilateral control to measure a slave working force applied to the environment by the slave robot; and
(2) allowing the operator to feel a sense of external dynamics of the slave actuator without feeling a sense of master dynamics of the master robot and internal dynamics of the slave actuator.

2. The master-slave system according to claim 1, wherein, the slave actuator includes:
a drive source for generating the slave driving force; and
mechanical impedance matching means or driving force transmitting means provided on an output axis of the drive source, and
the effective driving force sensor is a single-axis force sensor capable of measuring the slave effective driving force for a single axis and provided on an output axis of the mechanical impedance matching means or the driving three transmitting means, the output axis serving as the terminal output axis.

* * * * *